United States Patent
Havermann

(10) Patent No.: US 10,541,496 B2
(45) Date of Patent: Jan. 21, 2020

(54) PLUG CONNECTION

(71) Applicant: HARTING ELECTRIC GMBH & CO. KG, Espelkamp (DE)

(72) Inventor: Gert Havermann, Wallenhorst (DE)

(73) Assignee: HARTING ELECTRIC GMBH & CO. KG (DE)

( * ) Notice: Subject to any disclaimer, the term of this patent is extended or adjusted under 35 U.S.C. 154(b) by 0 days.

(21) Appl. No.: 15/745,962

(22) PCT Filed: Sep. 12, 2016

(86) PCT No.: PCT/DE2016/100426
§ 371 (c)(1),
(2) Date: Jan. 18, 2018

(87) PCT Pub. No.: WO2017/050316
PCT Pub. Date: Mar. 30, 2017

(65) Prior Publication Data
US 2018/0212365 A1    Jul. 26, 2018

(30) Foreign Application Priority Data
Sep. 24, 2015   (DE) ........................ 10 2015 116 134

(51) Int. Cl.
*H01R 13/6471* (2011.01)
*B61G 5/10* (2006.01)
(Continued)

(52) U.S. Cl.
CPC ........... *H01R 13/6471* (2013.01); *B61G 5/10* (2013.01); *H01R 13/04* (2013.01); *H01R 13/10* (2013.01); *H04B 5/0012* (2013.01)

(58) Field of Classification Search
CPC ................ H01R 13/6471; H01R 13/04; H01R 13/6464; H01R 13/10; H04B 5/0012; B61G 5/10; Y10S 439/95; G08C 17/06
(Continued)

(56) References Cited

U.S. PATENT DOCUMENTS 3,550,682 A    12/1970  Fowler ........................... 166/0.6
6,908,324 B1    6/2005  Morley et al. ................. 439/218
(Continued)

FOREIGN PATENT DOCUMENTS

DE    102006025503    11/2007   ............. H01R 13/24
DE    202013006512    10/2013   ............... B61G 5/10
(Continued)

OTHER PUBLICATIONS

International Preliminary Report on Patentability issued in application No. PCT/DE2016/100426, dated Mar. 27, 2018 (8 pgs).
(Continued)

*Primary Examiner* — Amy Cohen Johnson
*Assistant Examiner* — Paul D Baillargeon
(74) *Attorney, Agent, or Firm* — Hayes Soloway P.C.

(57) ABSTRACT

Provided is a plug connection which ensures signal integrity, in particular at high data rates and with a large number of plug-in cycles, in a cost-effective manner. A dielectric is in each case arranged between the pin contacts of a connector and the socket contacts of a mating connector to ensure galvanic isolation and capacitive connection between them. In this way the connected circuit electronics can be simplified. There is no need for a coupling capacitor and impedance matching can be performed the geometric arrangement of the contacts. In particular, it ensures that there is a variety of different plug connections to choose from with different properties, in particular with different impedances and capacitances.

15 Claims, 3 Drawing Sheets

(51) Int. Cl.
*H04B 5/00* (2006.01)
*H01R 13/04* (2006.01)
*H01R 13/10* (2006.01)

(58) Field of Classification Search
USPC .......................................................... 439/941
See application file for complete search history.

(56) References Cited

U.S. PATENT DOCUMENTS

| | | |
|---|---|---|
| 8,985,356 B2 | 3/2015 | Krause et al. .............. 213/75 R |
| 2005/0277315 A1 | 12/2005 | Mongold et al. ............. 439/108 |
| 2010/0093195 A1 | 4/2010 | Trout et al. ..................... 439/75 |
| 2013/0065415 A1 | 3/2013 | Van Swearingen et al. ................ 439/247 |
| 2015/0118898 A1 | 4/2015 | Paynter et al. ...... H01R 9/0503 |

FOREIGN PATENT DOCUMENTS

| | | | | |
|---|---|---|---|---|
| EP | 1647038 | 4/2006 | ............. | A41D 1/100 |
| EP | 2093122 | 2/2009 | ............... | B61G 5/10 |
| WO | WO2012034630 | 3/2012 | ............... | B61G 5/10 |

OTHER PUBLICATIONS

International Search Report (w/translation) and Written Opinion (w/o translation) issued in application No. PCT/DE2016/100426, dated Dec. 22, 2016 (13 pgs).
German Search Report (w/machine translation) issued in application No. 10 2015 116 134.6, dated Feb. 7, 2019 (14 pgs).

PLUG CONNECTION

BACKGROUND OF THE INVENTION

The invention is based on a plug-in connection comprising a plug and a mating plug, wherein the plug has a plurality of electrically conductive pin contacts and the mating plug has a plurality of associated electrically conductive socket contacts.

Plug-in connections of this kind are required, for example, in the rail sector in order to transmit signals, in particular radio frequency digital signals, within so-called train couplings between individual carriages.

DESCRIPTION OF THE PRIOR ART

At high data rates, for example in the frequency range of 1 GHz and more, plug-in connectors are often used, in particular, within train couplings, said plug-in connectors accordingly transmitting radio-frequency digital signals, for example, between the individual carriages of a train.

A fundamental problem is that conventional plug-in connector contacts which are suitable for transmitting high data rates of this kind, that is to say of, for example, 1 GHz and more, generally lack the requisite robustness for use in train couplings of this kind. Furthermore, a particularly high number of plug-in cycles is required by railway operators specifically for train couplings, it being possible to meet this requirement only with great difficulty using contacts of said kind.

Document DE 20 2013 006 512 U1 describes an electrical train coupling with transfer contacts which is distinguished in that it has an exchangeable changeover unit, it being possible for, for example, 150,000 plug-in cycles and more to be achieved without problems owing to said changeover unit being exchanged several times.

Document EP 2 093 122 B1 describes wireless communication between train parts via a WLAN coupling.

Document WO 2012/034630 A1 discloses a magnetic electrical coupling for trains, comprising a first and a second coupling part which each have a carrier in which a plurality of coupling parts are arranged, it being possible to produce an electrical, pneumatic and/or hydraulic coupling from one coupling part to the other coupling part using said plurality of coupling parts. Furthermore, at least one radio-frequency coupling which is formed by an encapsulated antenna in one coupling part and an encapsulated antenna in the other coupling part is provided.

All of these apparatuses have the disadvantage that production thereof is complicated and associated with corresponding costs. The first-mentioned conventional electrically conductive connections require impedance matching in the signal path and furthermore at least one capacitive decoupling means, in particular for protecting the respectively connected electronics system, and possibly further protective circuits, such as ESD protective diodes or varistors for current limiting for example. The wireless connections are generally even more complicated since they usually require a modulation/demodulation devices and associated antennas.

OBJECT OF THE INVENTION

The object of the invention is to specify a plug-in connection which ensures, in a cost-effective manner, signal integrity particularly at high data rates and also over a high number of plug-in cycles with a high degree of resistance to harmful environmental influences, such as soiling and moisture for example.

SUMMARY OF THE INVENTION

The plug-in connection according to the invention comprises a plug and a mating plug, wherein the plug has a plurality of electrically conductive pin contacts and the mating plug has a plurality of associated electrically conductive socket contacts, characterized in that in the plug-connected state at least one dielectric is arranged between the individual pin contacts of the plug and the associated socket contacts of the mating plug in each case, in order to DC-isolate the respective pin contact and the associated socket contact and to ensure a capacitive connection between them.

The invention serves to transmit radio frequency digital signals by plug connection, and in the process to simultaneously fulfill a protective function, for example the function of a coupling capacitor, for the connected electronics system and as an alternative or in addition to ensure suitable impedance matching. In this case, the transmission properties of the plug connection can be focused on the transmission protocols of the signals to be transmitted.

Furthermore, a high number of plug-in cycles is also ensured owing to the use of the dielectrics on account of the associated prevention of or at least reduction in abrasion of the contact surfaces.

The contacts, that is to say the pin contacts and the socket contacts in each case advantageously have a cable connection region and a plug-in region. Therefore, it may further be advantageous when the dielectrics substantially surround the respective contact, that is to say the respective pin contact and/or the respective socket contact, at least in their respective plug-in region because particularly effective corrosion protection is ensured in this way, in particular in this particularly sensitive region. In this context, the term "substantially surround" means that the respective contact is surrounded by the respective dielectric in its plug-in region in relation to its surrounding area, that is to say the preferably cylindrical pin contact is coated with the dielectric material on the outside and the preferably hollow-cylindrical socket contact is coated with the dielectric material both on the inside and on the outside; the natural electrically conductive connection of the preferably integral contact to its respective cable connection region is of course maintained, that is to say it is naturally not interrupted by the dielectric.

Owing to the use of the dielectrics and the associated DC-decoupling between the socket contact and the pin contact which is plug-connected to it, the connected circuit electronics system can, in particular, also be simplified upon application. In this way, it is possible to save, for example, coupling capacitors and/or other components which are usually provided for protecting the electronics system, for example ESD protective diodes and/or varistors for current limiting. Components of this kind are specifically usually used in the railway sector in order to protect the corresponding electronics system, for example, against overvoltages, it being possible for the transmission of said overvoltages to be effectively and cost-effectively suppressed by virtue of the present invention.

In addition or as an alternative to this protective function, impedance matching can furthermore also be performed according to the present invention by means of the geometric arrangement of the contacts, that is to say of the pin and socket contacts, in the following way: at least one signal output and/or at least one signal input of a primary-side electronics system can be fixedly electrically conductively connected, for example soldered or crimped, to the cable connection region of in each case one pin contact of the plug, for example, via an electrical line. Furthermore, at least one signal input and/or one signal output of a secondary-side electronics system can be electrically conductively connected to the cable connection region of in each case one corresponding socket contact in the same way. Capacitance which is produced in the plug-connected state between the pin contact and the socket contact can then be defined by means of the specific design of the at least one dielectric, for example by means of its respective thickness and/or its material, as early as during production of the plug and of the mating plug at the factory.

The impedance of this plug-in connection can likewise be adjusted as early as during production thereof, in particular by means of the specific geometric arrangement of specific contacts, that is to say specific pin contacts and socket contacts, and is therefore fixedly prespecified for this plug connection after the production process. To this end, the pin contacts and the socket contacts are each arranged in associated insulating bodies which are likewise composed of a dielectric material with a dielectric constant $\varepsilon_r$.

The frequency band which can be transmitted can be adjusted both by means of this capacitance and also by means of the impedance. These variables can therefore be defined as early as at the factory during production of the corresponding plug-in connectors, so that these transmission properties of a specific plug-in connection are prespecified to a user.

Accordingly, the invention provides for the production and provision of a large number of plug-in connections which each have a specific capacitance and impedance and are each intended for a specific transmission range.

Therefore, for different applications, a user can select, for example with reference to an associated datasheet, a plug-in connection which is suitable for his respective application.

To this end, it is particularly advantageous to use cylindrical pin contacts or at least substantially cylindrical pin contacts and hollow-cylindrical socket contacts, or at least substantially hollow-cylindrical socket contacts, because these considerably simplify the design of the arrangement. In this context, the term "substantially" means that the pin contacts have at least one cylindrical plug-in region and that the socket contacts have at least one hollow cylindrical plug-in region, wherein these regions can also be rounded at their ends.

As an alternative or in addition, it is further advantageous to this end to arrange at least some of the contacts at regular intervals in relation to one another in a matrix because this also considerably improves the ability to calculate the impedance. In this case, some of the contacts can have, in particular, the ground potential of the respective electronics system and, for example owing to the geometric arrangement thereof in the outer region of the respective matrix, be used for shielding further contacts which are arranged in an inner region of the matrix and also the signals which are transmitted by them.

It is particularly advantageous that, in this way, the transmission properties, in particular the capacitance and the impedance of the plug-in connection, can be matched to specific transmission requirements of the signals to be transmitted, in particular over the entire signal path.

In a preferred refinement, a plurality of different plug-in connections according to the invention with different transmission properties for various signals can be provided, as already indicated above, by the manufacturer. In particular, it is provided that a plurality of different plug-in connections with different impedances and capacitances are provided for selection. In accordance with the respectively provided transmission protocol, a suitable plug-in connection can then be selected by the user depending on requirements during use, in order to thereby ensure the corresponding transmission properties. For example, the signals which are provided for transmission can satisfy standardized digital cable-bound transmission protocols, that is to say, for example, correspond to the specifications of PCIe; RapidIO, Ethernet, or DisplayPort or similar protocols.

In each case, it is advantageous that wear of the contact material of the pin contacts and of the socket contacts, in particular the contact coating thereof, is reduced by the use of the dielectric. As a result, it is also possible, in particular, for the use of expensive noble metals, for example in the form of gold coating of the contacts, to be reduced or even avoided.

This is particularly true of those contacts to which the dielectric is applied, for example sprayed on. Therefore, it is particularly advantageous when both the pin contacts and also the socket contacts are each provided with a dielectric. To this end, both the preferably cylindrical pin contacts are sheathed with a dielectric at least in their plug-in region and also the socket contacts are likewise at least internally coated and preferably also sheathed with dielectric material at least in their plug-in region. A pin contact of this kind is then, in the plug-connected state, advantageously suitably positioned in its position in relation to the socket contact in order to ensure the desired capacitance across both dielectrics.

As already mentioned, this is particularly advantageous because electrically conductive contact materials can be dispensed with in this way, this resulting in a cost saving, in particular on account of the high price of corresponding materials, in particular gold. The dielectric can therefore finally also provide sufficient corrosion protection in the contact region. Only the less sensitive cable connection region of the contact, which is intended to be connected to a data cable, may possibly still require further corrosion protection, for example in the form of a conventional coating.

Conventional contacts can advantageously also be protected by the use of mating contacts according to the invention. In a further preferred refinement, the coating, in particular a gold coating of a conventional, preferably cylindrical pin contacts, for example can experience significantly less abrasion when a preferably hollow-cylindrical dielectric is arranged at least on the inside of the socket contact with which said pin contact is used. Conversely, in another refinement, a conventional socket contact, that is to say a, for example, gold-coated socket contact which is, however, not dielectrically internally coated, may also experience less wear since it is used with a dielectrically externally coated pin contact.

Therefore, all of these options result in less wear of the contact surfaces, and simply for this reason a considerable cost saving and an increase in the number of possible plug-in cycles.

Finally, a higher number of possible plug-in cycles also means that less servicing work has to be performed during operation, this therefore not only simplifying and reducing the cost of production but also the operation of the plug-in connection and preventing or at least reducing corresponding downtimes.

For mechanical stability and precisely complying with a prespecified capacitance, it is advantageous when the at least one dielectric mechanically connects the respective pin contact to the associated socket contact in the plug-connected state. If both the pin contact and also the socket contact are each coated with a dielectric, these two dielectrics can advantageously be in mechanical contact with one another. As a result, the distance between the pin contact and the socket contact is finally also defined with a sufficient degree of accuracy.

Owing to minimal irregularities in the surfaces of these dielectrics, it goes without saying that a slight air gap can be produced between the dielectric of the pin contacts and the dielectric of the socket contacts at some points, said air gap being required, for example, for enabling the pin contact to be plugged connected to the socket contact. However, the capacitance of this transmission is not noticeably corrupted as a result, firstly because these irregularities cause an only slight change in distance which is of little significance, and secondly because an, in particular, cylindrical pin contact in a hollow-cylindrical socket contact, despite being somewhat at a distance from a portion of the socket owing to a slight deviation from its central position likewise thereby automatically comes closer to the same socket in an opposite region, so that the effect of minor irregularities in the surfaces of the dielectrics on the capacitance between the pin contact and the socket contact and on the associated electronic transmission properties can be ignored in good approximation.

In a particularly preferred refinement, the plug-in connection, as already indicated above, has a matrix of contacts which has geometrically external and geometrically internal contacts, wherein the external contacts are electrically conductively connected to the ground connection of the respective electronics system and therefore serve to shield the internal contacts. By way of example, the plug can have sixteen pin contacts which are arranged at regular intervals in a matrix of four rows and four columns, as a result of which a group of twelve outer pin contacts and a further group of four inner pin contacts are formed. The mating plug then also has outer and inner socket contacts which are arranged in a corresponding manner, that is to say, for example, at regular intervals in a square matrix of four rows and four columns, as a result of which, in particular, twelve outer socket contacts and four inner socket contacts are also formed.

It is particularly advantageous that four inner contacts, that is to say two pairs of contacts, are formed because these can then carry both a differential signal and also a differential return signal. These inner contacts can be geometrically arranged in a square pattern, wherein the two contacts which belong to a differential pair are arranged in each case diagonally in relation to one another in order to minimize the mutual crosstalk with the contacts of the respectively other pair.

The outer pin contacts of the plug are advantageously electrically conductively connected to one another in order to be jointly electrically conductively connected to the ground potential of a primary-side electronics system. The outer socket contacts of the mating plug are advantageously also electrically conductively connected to one another in order to be jointly electrically conductively connected to the ground potential of a secondary-side electronics system. Therefore, in the plug-connected state, a capacitive connection can be ensured between these two ground potentials, specifically the ground potential of the primary-side electronics system and the ground potential of the secondary-side electronics system. Therefore, the abovementioned advantages of the capacitive plug-in connection apply not only to the signal lines but also to ground lines and, in addition or as an alternative, to a return signal current and/or a shielding connection.

In particular, the four inner pin contacts of the plug can be electrically conductively connected to the cable connection regions thereof separately via four separate lines in pairs with in each case one differential signal input and one differential signal output of the primary electronics system, for example by soldering or crimping. In the same way, the four inner socket contacts of the mating plug are then also connected in pairs to in each case one differential signal output and one differential signal input of the secondary electronics system. As a result, a bidirectional communication interface with a feed and return line and with high signal integrity is in particular provided for particularly high-frequency signals too.

Furthermore, the impedance can be adapted by virtue of the distances of the differential pairs of contacts in relation to one another. To this end, it is advantageous to use cylindrical contacts, that is to say cylindrical pin contacts and hollow-cylindrical socket contacts, because this considerably simplifies the calculation and the corresponding simulation of the impedance of an arrangement of this kind.

A suitable formula for determining the impedance of the pair of signals, comprising cylindrical contacts, is as follows:

$$d = r \, 10^{\frac{Z_0 \sqrt{\varepsilon_r}}{276\Omega}}$$

where:
$\varepsilon_r$ is the dielectric constant of the material of the insulating body
$Z_o$ is the impedance
d is the distance between the center points of the cylindrical contacts
r is the outside radius of the cylindrical contacts Here, the cylindrical contacts are intended to be understood, in the plug-connected state, to be a combination of pin and socket contacts which are plug-connected to one another. The outside radius r is therefore given by the outside radius of the hollow-cylindrical socket contact.

For a desired differential impedance of 70Ω to 120Ω, this results, for example, in an arrangement of the contacts of a differential pair of contacts in relation to one another in which their distance d is approximately given by the following relationship: 10 r>d>3 r. The distance between the differential pairs which are arranged, in particular, in a square pattern should therefore be greater than three times the outside radius r of the socket contacts and less than ten times the outside radius r thereof in this case.

However, in further embodiments, the pin contacts and socket contacts of the matrix do not necessarily have to be arranged at regular intervals. Instead, irregular contact patterns are also possible. In addition, the pin contacts and socket contacts do not necessarily have to be cylindrical, but rather other shapes are also possible in principle, it being possible for them to have, for example, a substantially polygonal shape in cross section, in the case of which, for example, the corners are rounded.

DESCRIPTION OF THE DRAWINGS

An exemplary embodiment of the invention is illustrated in the drawings and will be explained in greater detail below. In the drawings.

The figures contain partly simplified, schematic illustrations. In some cases, identical reference symbols are used for elements which are similar but may not be identical. Different views of the same elements may be drawn to different scales.

DETAILED DESCRIPTION OF THE INVENTION

Figure 1A:
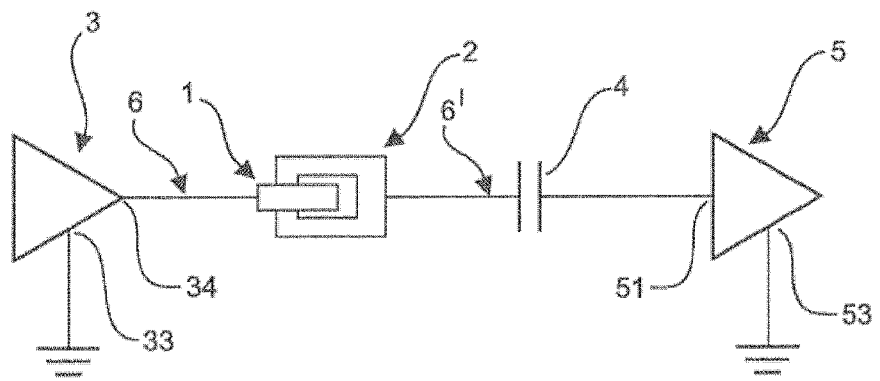
FIG. 1a shows a conventional plug-in connection.

FIG. 1 shows a circuit diagram of a conventional plug-in connection, that is to say a plug-in connection which corresponds to the prior art. Here, a primary-side electronics system 3 is firstly connected to an associated reference ground connection by way of a ground connection 33 which is provided for this purpose and is furthermore electrically conductively connected, for example by crimping or soldering, to a cable connection region of a pin contact 1 by way of an output 34 via a primary-side line 6.

At the plug-in end, this contact 1 is electrically conductively connected to a conventional socket contact 2. The socket contact 2 is connected in a DC-isolated manner to an input 51 of a secondary side electronics system 5, which is further connected to an associated reference ground connection by way of a ground connection 53 which is provided for this purpose, by way of its cable connection region via a secondary-side line 6' and via a coupling capacitor 4.

Figure 1B:
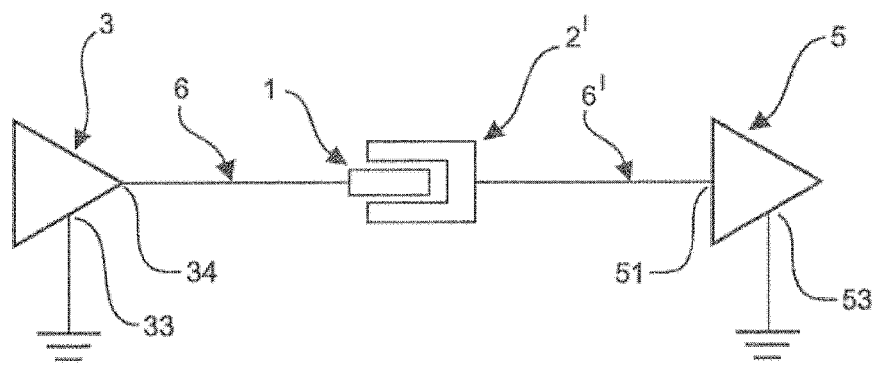
FIG. 1b shows a first embodiment of a capacitive plug-in connection.

FIG. 1b shows, in a further circuit diagram, a first embodiment of the solution according to the invention, specifically a first capacitive plug-in connection, comprising the above-described primary side electronics system 3 and the secondary-side electronics system 5 and the contacts which are connected thereto, specifically the pin contact 1 which is electrically conductively connected thereto, and also a socket contact 2' according to the invention which is plug-connected to the pin contact 1. In this embodiment, the pin contact 1 is DC-isolated from the socket contact 2' but capacitively coupled to it. At the cable connection end, the socket contact 2' is electrically conductively connected, for example by crimping or soldering, to the input 51 of the above-described secondary-side electronics system 5 via the secondary-side line 6'.

Figure 1C:
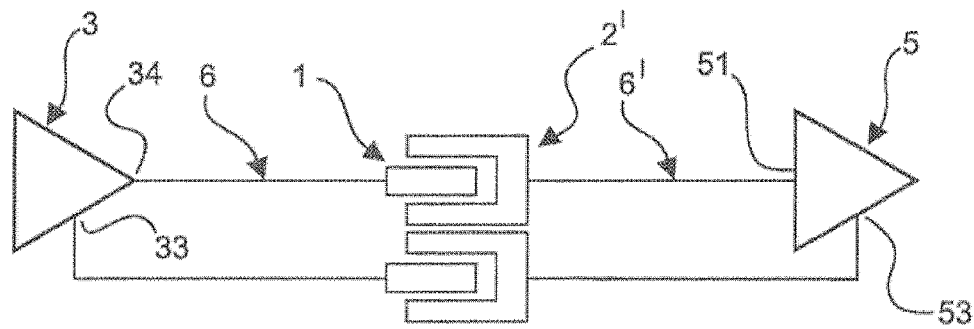
FIG. 1c shows a second embodiment of a capacitive plug-in connection.

FIG. 1c likewise shows, in the form of a circuit diagram, a second embodiment of the solution according to the invention, specifically a second capacitive plug-in connection. The output 34 of the primary-side electronics system 3 is, as described above in the case of the first embodiment, capacitively coupled to the input 51 of the secondary-side electronics system 5 by means of the pin contact 1 and the socket contact 2'. However, in contrast to the preceding example, the ground connections 33, 53 of the primary-side electronics system 3 and of the secondary-side electronics system 5 are likewise capacitively coupled to one another by means of a capacitive plug connection of this kind comprising a pin contact 1 and a socket contact 2' according to the invention. Therefore, a capacitive connection of the two ground potentials, specifically of the primary ground potential 33 and of the secondary ground potential 53, is also produced, this being advantageous in various respects in radio-frequency technology, for example for reducing the susceptibility to faults.

For the sake of clarity, the further components of this kind, such as pin contacts 1 and socket contacts 2', are not provided with reference symbols in the drawing here and below.

Figure 1D:
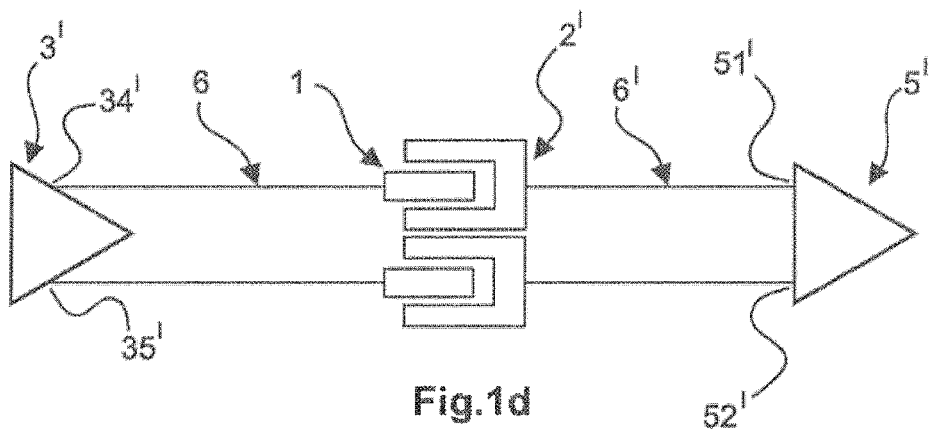
FIG. 1d shows a third embodiment of a capacitive plug-in connection.

FIG. 1d likewise shows a circuit diagram of a third embodiment of the solution according to the invention, specifically a third capacitive plug-in connection which differs from the above-described second embodiment only by virtue of its wiring. The primary-side electronics system 3' has two differential signal outputs 34' and 35', and the secondary side electronics system 5' has two differential signal inputs 51', 52'. The two differential outputs 34', 35' of the primary-side electronics system 3' are capacitively coupled to these differential inputs 51', 52' by means of in each case a pin contact 1 and a socket contact 2' according to the invention.

Figure 1E:
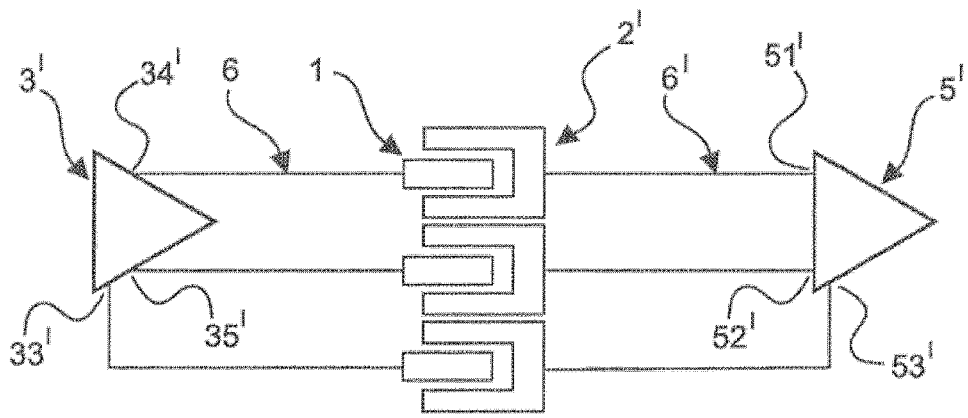
FIG. 1e shows a fourth embodiment of a capacitive plug-in connection.

FIG. 1e shows a circuit diagram of a fourth embodiment which differs from the third embodiment only in that, in addition to the differential signal transmission, the ground potentials 33', 53' of the primary electronics system 3' and of the secondary electronics system 5' are also capacitively coupled to one another.

In these four embodiments of the invention, a conventional contact 1 and a socket 2' according to the invention are used in each case, that is to say the socket 2' is at least internally coated with a dielectric material 21' at least in its plug-in region in order to ensure capacitive isolation from the contact 1. In an alternative embodiment, the contact 1 could also be sheathed with a dielectric material 21' or both the socket 2' and also the contact 1 could be coated with the dielectric material 21'.

Figure 2:
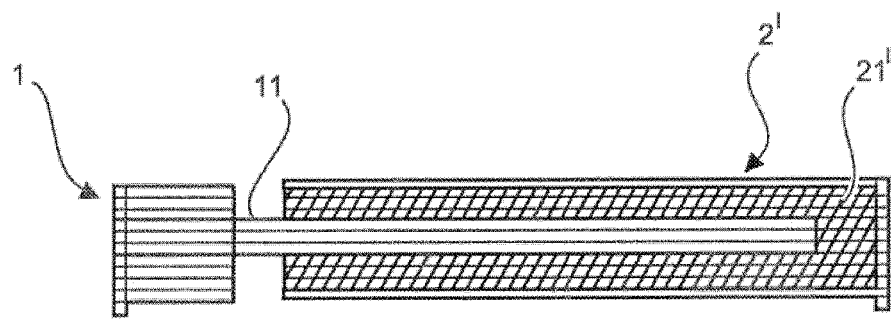
FIG. 2 shows a capacitive plug-in connection with a dielectric.

FIG. 2 shows one possible design of a capacitive plug-in connection of this kind, comprising the pin contact 1 which has at least one cylindrical plug-in region 11 which can be inserted into the hollow-cylindrical socket contact 2' by an insertion depth which is not indicated in any detail.

A likewise hollow-cylindrical dielectric 21' is arranged between the pin contact and the socket contact. To this end, the hollow space between the pin contact and the socket contact was filled with a dielectric material for experimental purposes. The intention of this is to demonstrate the manner of operation of the solution according to the invention experimentally and by simulation. It can easily be seen that the dielectric material can be arranged both on the pin contact 1 and also on the socket contact 2', and therefore the corresponding contact 1, 2' can be coated with said dielectric material. In particular, as already mentioned above, the two contacts, that is to say the pin contact 1 and the socket contact 2', can also be coated with the dielectric material 21' simultaneously. This is even particularly advantageous because it ensures corrosion and wear protection for the plug-in regions of the two contacts. For better plug-connectability, a small air gap then remains between the two dielectrics 21', but said air gap does not have any appreciable effects on the resulting transmission properties of the plug-in connection.

Therefore, a prespecified distance between the pin contact 1 and the socket contact 2' is ensured in each case by the at least one dielectric. As a result, this arrangement has a defined capacitance.

Furthermore, an important parameter for adjusting the capacitance is likewise provided by the insertion depth of the plug-in region 11 of the pin contact 1 into the socket contact 2'. In particular, this insertion depth can be particularly exactly adjusted as a parameter on account of its geometric size, this being particularly advantageous for producing the plug-in connection.

Figure 3:
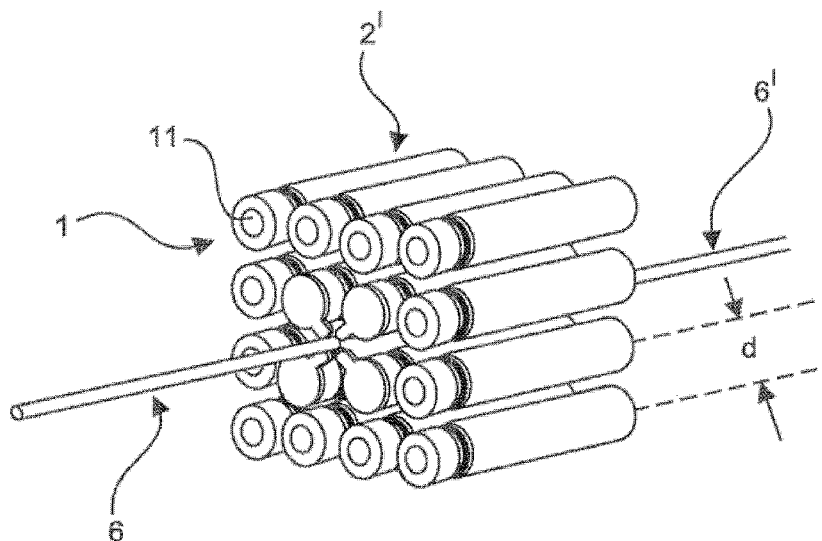
FIG. 3 shows a matrix which is formed from pin and socket contacts.

FIG. 3 shows a square matrix which is formed from sixteen cylindrical pin contacts 1 and socket contacts 2' which are arranged at regular distances d. Therefore, twelve outer contacts and four inner contacts are formed.

In particular, the four inner contacts are arranged at a regular distance d in relation to one another.

The contacts are usually each arranged in an insulating body, wherein the insulating body is likewise formed from a dielectric material.

As an alternative, differently shaped pin contacts and socket contacts could also be used. It is only necessary to ensure by virtue of the shape and arrangement of the dielectric that the respective pin contact can be connected to the socket contact by means of the associated dielectric in such a way that realization of a desired capacitance is ensured in the process. However, in the present exemplary embodiment, cylindrical contacts are preferably used because this greatly simplifies calculation and handling of the arrangement.

The pin contacts and socket contacts can furthermore be arranged at irregular distances. However, in the present exemplary embodiment, a regular arrangement is preferred at least for the four inner contacts because this simplifies calculation and handling.

The primary-side electronics system 3' and the secondary-side electronics system 5 are not shown in this illustration for reasons of clarity. However, a primary-side line 6 and a secondary-side line 6' are shown here. These two lines 6, 6' each comprise two pairs of cores, not illustrated, for transmitting a differential signal in each case. The two cores of each pair of cores are each connected to one of the four central contacts or socket contacts 2'. In particular, the two cores of each pair of cores are connected to two inner contacts which are situated diagonally opposite one another, as a result of which the crosstalk to the respectively other contacts is minimized.

The twelve outer pin contacts are electrically conductively connected to one another and jointly to the ground potential 33 of the primary-side electronics system 3', for example via an electrical line, not shown.

The twelve outer socket contacts are electrically conductively connected to one another and jointly to the ground potential 53 of the secondary-side electronics system 5' for example via a second electrical line, not shown.

Therefore, the two ground potentials 33', 53' are also capacitively coupled to one another by means of the plug-in connection.

In this way, the outer contacts shield the inner contacts from capacitive interference phenomena.

Plug Connection

LIST OF REFERENCE SYMBOLS

1 Pin contact
11 Plug-in region of the pin contacts
2, 2' Socket contact
21' Dielectric
3, 3' Primary-side electronics system
33, 33' Ground connection of the primary-side electronics system
34 Signal output of the primary-side electronics system
34', 35' Differential signal outputs of the primary-side electronics system
4 Coupling capacitor
5, 5' Secondary-side electronics system
51 Signal input of the secondary-side electronics system
51', 52' Differential signal inputs of the secondary-side electronics system
53, 53' Ground connection of the primary-side electronics system
6, 6' Signal line
d Distance between the center points of the contacts
$\varepsilon_r$ Dielectric constant of the material of the insulating body
$Z_o$ Impedance
r Outside radius of the cylindrical contacts

The invention claimed is:

1. A plug-in connection, comprising a plug and a mating plug,
wherein the plug has a plurality of electrically conductive pin contacts including signal carrying pins and ground pins arranged in a matrix, and the mating plug has a plurality of associated electrically conductive socket contacts including signal carrying sockets and outer ground socket contacts arranged in a matching matrix, wherein
in a plug-connected state at least one dielectric is arranged between individual pin contacts of the plug and associated socket contacts of the mating plug in each case, in order to DC-isolate the respective pin contact and the associated socket contact and to ensure a capacitive connection between them;
wherein the matrix arrangement comprises outer pin ground contacts and inner pin signal carrying contacts wherein the outer pin ground socket contacts are arranged to completely surround the inner pin signal carrying contacts, wherein all of the inner pin signal carrying contacts are surrounded by outer pin around contacts in the matrix, and
wherein the outer pin ground contacts are electrically conductively connected to one another and are configured to be jointly electrically conductively connected to a ground potential of a primary-side electronics system, and in that the outer ground socket contacts are electrically conductively connected to one another and are configured to be jointly electrically conductively connected to a ground potential of a secondary-side electronics system, so that the outer pin and the outer socket contacts, owing to the plug-in connection, capacitively couple the primary-side electronics system and the secondary-side electronic system ground potentials to one another and furthermore have a shielding function for the inner signal carrying contacts.

2. The plug-in connection as claimed in claim 1, wherein the pin contacts and socket contacts each have a cable connection region and a plug-in region, and in that the respective pin contact and/or the associated socket contact are provided with the dielectric at least at their respective plug-in region.

3. The plug-in connection as claimed in claim 1, wherein the socket contacts are of hollow-cylindrical design.

4. The plug-in connection as claimed in claim 1, wherein the pin contacts are of cylindrical design or have at least one cylindrical plug-in region.

5. The plug-in connection as claimed in claim 1, wherein both the plug and the mating plug each have an insulating body which is composed of a further dielectric material.

6. The plug-in connection as claimed in claim 1, wherein the plug-in connection has four inner signal carrying contacts which are arranged in a square pattern and are configured to be connected in pairs to a differential input of the primary-side electronics system and the secondary-side electronics system, wherein the contacts which belong to one differential pair are arranged in each case diagonally in relation to one another in order to minimize mutual crosstalk with the contacts of the respectively other pair.

7. The plug-in connection as claimed in claim 6, wherein the impedance of the plug-in connection is configured to be adjusted by adjusting an outside radius (r) of the inner hollow-cylindrical contact sockets and a distance of their center points (d) in relation to one another.

8. The plug-in connection as claimed in claim 7, wherein the coupling capacitance of the plug-in connection is configured to be adjusted by adjusting the distance between the center contact pins and the respectively associated contact socket and the at least one dielectric which is arranged therebetween.

9. The plug-in connection as claimed in claim 6, wherein the coupling capacitance of the plug-in connection is configured to be adjusted by adjusting a distance between the inner contact pins and the respectively associated contact socket and the at least one dielectric which is arranged therebetween.

10. A plug-in connection, comprising a plug and a mating plug,
wherein the plug has a plurality of electrically conductive pin contacts and the mating plug has a plurality of associated electrically conductive socket contacts wherein in the plug-connected state at least one dielectric is arranged between individual pin contacts of the plug and associated inner hollow cylindrical socket contacts of the mating plug in each case, in order to DC-isolate the respective pin contact and the associated socket contact and to ensure a capacitive connection between them,
wherein each plug has a plurality of signal carrying pins and a plurality of ground pins arranged in a matrix, and each socket has a plurality of mating signal carrying sockets and a plurality of mating ground sockets arranged in a matching matrix,
wherein the matrix arrangement comprises outer pin ground contacts and inner pin signal carrying contacts wherein the outer pin ground socket contacts are arranged to completely surround the inner pin signal carrying contacts, wherein all of the inner pin signal carrying contacts are surrounded by outer pin ground contacts in the matrix, and
wherein the outer pin ground contacts are electrically conductively connected to one another and are configured to be jointly electrically conductively connected to a ground potential of a primary-side electronics system, and in that the outer ground socket contacts are electrically conductively connected to one another and are configured to be jointly electrically conductively connected to a ground potential of a secondary-side electronics system, so that the outer pin and the outer socket contacts, owing to the plug-in connection, capacitively couple the primary-side electronics system and the secondary-side electronic system ground potentials to one another and furthermore have a shielding function for the inner signal carrying contacts,
wherein an impedance of the plug-in connection is configured to be adjusted by adjusting a geometry of the pin contacts and associated inner hollow-cylindrical socket contacts, and adjusting an outside radius (r) of the inner hollow-cylindrical socket contacts and a distance of their center points (d) in relation to one another.

11. The plug-in connection as claimed in claim 10, wherein the pin contacts and inner hollow-cylindrical socket contacts each have a cable connection region and a plug-in region, and in that the respective pin contact and/or the associated inner hollow-cylindrical socket contact are provided with the dielectric at least at their respective plug-in region.

12. The plug-in connection as claimed in claim 10, wherein both the plug and the mating plug each have an insulating body which is composed of a further dielectric material and in which the pin contacts and the inner hollow-cylindrical socket contacts, are arranged in a matrix in each case.

13. The plug-in connection as claimed in claim 12, wherein the matrix comprises outer contacts and inner contacts.

14. The plug-in connection as claimed in claim 10, wherein a coupling capacitance of the plug-in connection is configured to be adjusted by adjusting a distance between inner contact pins of the plug-in connection and the respectively associated inner hollow-cylindrical contact socket and the at least one dielectric which is arranged therebetween.

15. The plug-in connection as claimed in claim 10, wherein a coupling capacitance of the plug-in connection is configured to be adjusted by adjusting a distance between center contact pins of the plug-in connection and the respectively associated inner hollow-cylindrical contact socket and the at least one dielectric which is arranged therebetween.

* * * * *

UNITED STATES PATENT AND TRADEMARK OFFICE
CERTIFICATE OF CORRECTION

PATENT NO. : 10,541,496 B2
APPLICATION NO. : 15/745962
DATED : January 21, 2020
INVENTOR(S) : Gert Havermann Page 1 of 1

It is certified that error appears in the above-identified patent and that said Letters Patent is hereby corrected as shown below:

In the Claims

Claim 1, Column 10, Line 41 "outer pin around" should be --outer pin ground--

Signed and Sealed this
Thirty-first Day of March, 2020

Andrei Iancu
*Director of the United States Patent and Trademark Office*